(12) United States Patent
You et al.

(10) Patent No.: US 11,536,796 B2
(45) Date of Patent: Dec. 27, 2022

(54) SOUND SOURCE DETERMINING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Hanhao You, Shenzhen (CN); Xiaobin Shen, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 79 days.

(21) Appl. No.: 16/933,412

(22) Filed: Jul. 20, 2020

(65) Prior Publication Data
US 2020/0348387 A1 Nov. 5, 2020

Related U.S. Application Data

(63) Continuation of application No. PCT/CN2019/081259, filed on Apr. 3, 2019.

(30) Foreign Application Priority Data

May 29, 2018 (CN) .......................... 201810532413.2

(51) Int. Cl.
*A63F 13/537* (2014.01)
*G01S 3/808* (2006.01)
(Continued)

(52) U.S. Cl.
CPC .......... *G01S 3/8083* (2013.01); *A63F 13/537* (2014.09); *G01S 5/20* (2013.01);
(Continued)

(58) Field of Classification Search
CPC .............. A63F 13/537; A63F 2300/306; A63F 2300/6072; A63F 2300/6081;
(Continued)

(56) References Cited

U.S. PATENT DOCUMENTS 5,717,869 A * 2/1998 Moran .................... G11B 27/28
707/999.002
5,768,382 A * 6/1998 Schneier ................. A63F 13/12
713/180
(Continued)

FOREIGN PATENT DOCUMENTS

CN 107469354 A 12/2017
CN 107890672 A 4/2018
(Continued)

OTHER PUBLICATIONS

Machine translation of CN 107992281 A, downloaded from espacenet. com on Sep. 14, 2021.*
(Continued)

*Primary Examiner* — David L Lewis
*Assistant Examiner* — Matthew D Hoel
(74) *Attorney, Agent, or Firm* — Crowell & Moring, L.L.P.

(57) ABSTRACT

This application discloses a method and apparatus for determining characteristics of a sound source. The method may include: acquiring a first position of a first virtual role controlled by an application client in a virtual scene; detecting, in a sound source detection area associated with the first position, a second position of a sound source virtual object in the virtual scene; determining transparency of a position mark that matches the sound source virtual object, according to a sound source distance between the first position and the second position, the position mark identifying the second position of the sound source virtual object; and displaying, on an interaction interface of the application client, the position mark of the sound source virtual object according to the transparency.

20 Claims, 6 Drawing Sheets

(51) Int. Cl.
*G01S 5/20* (2006.01)
*G01F 3/16* (2006.01)
*G06F 3/16* (2006.01)

(52) U.S. Cl.
CPC ........ *G06F 3/162* (2013.01); *A63F 2300/306* (2013.01); *A63F 2300/6072* (2013.01); *A63F 2300/6081* (2013.01); *A63F 2300/8076* (2013.01)

(58) Field of Classification Search
CPC .. A63F 2300/8076; G01S 3/8083; G01S 5/20; G01S 3/162
See application file for complete search history.

(56) References Cited

U.S. PATENT DOCUMENTS

| | | | | |
|---|---|---|---|---|
| 5,802,296 | A * | 9/1998 | Morse | G06F 3/14 345/8 |
| 5,880,731 | A * | 3/1999 | Liles | G06F 3/0481 345/473 |
| 5,886,697 | A * | 3/1999 | Naughton | H04L 67/75 348/E5.103 |
| 5,907,831 | A * | 5/1999 | Lotvin | G09B 7/02 434/350 |
| 5,971,855 | A * | 10/1999 | Ng | A63F 13/92 463/40 |
| 6,022,273 | A * | 2/2000 | Gabai | A63H 30/04 345/474 |
| 6,031,549 | A * | 2/2000 | Hayes-Roth | G06T 13/40 345/474 |
| 6,173,267 | B1 * | 1/2001 | Cairns | G06Q 30/02 |
| 6,210,272 | B1 * | 4/2001 | Brown | G09B 7/04 434/350 |
| 6,219,045 | B1 * | 4/2001 | Leahy | H04L 67/10 709/204 |
| 6,267,672 | B1 * | 7/2001 | Vance | G07G 1/0036 463/40 |
| 6,273,815 | B1 * | 8/2001 | Stuckman | A63F 13/825 463/9 |
| 6,388,665 | B1 * | 5/2002 | Linnett | G06F 3/04817 345/473 |
| 6,404,438 | B1 * | 6/2002 | Hatlelid | G06F 3/033 434/350 |
| 6,435,875 | B1 * | 8/2002 | Karussi | G09B 19/16 463/7 |
| 6,476,830 | B1 * | 11/2002 | Farmer | G06Q 30/0641 715/977 |
| 6,522,333 | B1 * | 2/2003 | Hatlelid | H04M 1/2478 345/473 |
| 6,663,105 | B1 * | 12/2003 | Sullivan | G06Q 30/0225 463/16 |
| 6,677,968 | B1 * | 1/2004 | Appelman | G06F 3/0484 709/210 |
| 6,729,884 | B1 * | 5/2004 | Kelton | G09B 23/28 434/323 |
| 6,758,746 | B1 * | 7/2004 | Hunter | A63F 13/822 463/9 |
| 6,773,325 | B1 * | 8/2004 | Mawle | A63F 13/23 446/298 |
| 6,832,955 | B2 * | 12/2004 | Yokoi | G06N 20/00 463/40 |
| 6,845,486 | B2 * | 1/2005 | Yamada | G06F 16/954 715/848 |
| 6,890,179 | B2 * | 5/2005 | Rogan | G09B 7/00 434/362 |
| 6,910,186 | B2 * | 6/2005 | Kim | G06Q 10/107 715/752 |
| 6,951,516 | B1 * | 10/2005 | Eguchi | A63F 13/323 463/40 |
| 6,954,728 | B1 * | 10/2005 | Kusumoto | G06Q 30/0241 705/14.12 |
| 7,012,602 | B2 * | 3/2006 | Watson | G06F 3/04815 715/755 |
| 7,032,187 | B2 * | 4/2006 | Keely, Jr. | G06F 3/0483 715/779 |
| 7,054,831 | B2 * | 5/2006 | Koenig | A63F 13/61 463/16 |
| 7,058,897 | B2 * | 6/2006 | Matsuda | G06Q 10/10 715/753 |
| 7,061,493 | B1 * | 6/2006 | Cook | G06T 13/40 345/473 |
| 7,062,722 | B1 * | 6/2006 | Carlin | G06T 15/10 715/848 |
| 7,086,005 | B1 * | 8/2006 | Matsuda | H04M 7/003 715/706 |
| 7,139,796 | B2 * | 11/2006 | Rekimoto | H04L 9/40 709/204 |
| 7,168,051 | B2 * | 1/2007 | Robinson | G06F 16/954 715/848 |
| 7,210,104 | B2 * | 4/2007 | Nakagawa | G06F 16/34 707/E17.093 |
| 7,249,139 | B2 * | 7/2007 | Chuah | G06F 16/958 707/999.102 |
| 7,314,407 | B1 * | 1/2008 | Pearson | A63F 13/69 463/7 |
| 7,342,587 | B2 * | 3/2008 | Danzig | H04L 67/131 715/753 |
| 7,396,281 | B2 * | 7/2008 | Mendelsohn | G06Q 30/0209 725/23 |
| 7,425,169 | B2 * | 9/2008 | Ganz | G06Q 30/0258 446/175 |
| 7,442,108 | B2 * | 10/2008 | Ganz | G06Q 30/0222 446/175 |
| 7,465,212 | B2 * | 12/2008 | Ganz | G06Q 20/20 446/175 |
| 7,493,558 | B2 * | 2/2009 | Leahy | H04L 67/306 715/751 |
| 7,534,157 | B2 * | 5/2009 | Ganz | G06Q 30/0222 446/175 |
| 7,568,964 | B2 * | 8/2009 | Ganz | A63F 13/00 446/175 |
| 7,587,338 | B2 * | 9/2009 | Owa | G06Q 30/0601 705/26.1 |
| 7,604,525 | B2 * | 10/2009 | Ganz | G06Q 30/0236 446/175 |
| 7,618,303 | B2 * | 11/2009 | Ganz | A63F 13/00 446/175 |
| 7,677,948 | B2 * | 3/2010 | Ganz | A63H 3/36 446/175 |
| 7,789,726 | B2 * | 9/2010 | Ganz | A63F 9/24 446/175 |
| 7,823,074 | B2 * | 10/2010 | Takemura | H04L 12/282 715/848 |
| 7,846,004 | B2 * | 12/2010 | Ganz | G06Q 30/0276 446/175 |
| 7,862,428 | B2 * | 1/2011 | Borge | A63F 13/69 463/32 |
| 8,719,730 | B2 * | 5/2014 | Ganetakos | A63F 13/537 715/834 |
| D822,036 | S * | 7/2018 | Carlson | D14/485 |
| 10,030,931 | B1 * | 7/2018 | Black | F41A 33/00 |
| 10,394,414 | B1 * | 8/2019 | Wakeford | A63F 13/67 |
| 10,661,172 | B2 * | 5/2020 | Shao | A63F 13/54 |
| 10,765,947 | B2 * | 9/2020 | Li | A63F 13/54 |
| 10,788,949 | B2 * | 9/2020 | Wakeford | A63F 13/355 |
| 11,086,477 | B2 * | 8/2021 | Wakeford | A63F 13/67 |
| 11,241,625 | B2 * | 2/2022 | Wang | A63F 13/215 |
| 11,291,911 | B2 * | 4/2022 | Saville | A63F 13/5372 |
| 2002/0007313 | A1 * | 1/2002 | Mai | G06Q 30/0218 705/26.1 |
| 2002/0054094 | A1 * | 5/2002 | Matsuda | G06Q 10/10 715/753 |
| 2002/0090985 | A1 * | 7/2002 | Tochner | A63F 13/655 463/9 |
| 2002/0119810 | A1 * | 8/2002 | Takatsuka | A63F 13/10 463/7 |

(56) References Cited

U.S. PATENT DOCUMENTS

| | | | |
|---|---|---|---|
| 2002/0130894 A1* | 9/2002 | Young | G06F 16/954 715/706 |
| 2002/0147640 A1* | 10/2002 | Daniele | G06Q 30/0212 463/25 |
| 2002/0169668 A1* | 11/2002 | Bank | G06Q 30/0235 705/14.57 |
| 2003/0018523 A1* | 1/2003 | Rappaport | G06Q 30/0237 705/14.27 |
| 2003/0065721 A1* | 4/2003 | Roskind | H04L 51/04 709/204 |
| 2003/0216177 A1* | 11/2003 | Aonuma | A63F 13/5372 463/32 |
| 2004/0030595 A1* | 2/2004 | Park | G07F 17/3223 705/14.27 |
| 2004/0043806 A1* | 3/2004 | Kirby | A63F 13/005 463/6 |
| 2004/0093266 A1* | 5/2004 | Dohring | G06Q 30/0222 705/14.23 |
| 2004/0189702 A1* | 9/2004 | Hlavac | A63F 13/58 715/757 |
| 2004/0221243 A1* | 11/2004 | Twerdahl | G06F 3/0482 715/810 |
| 2004/0229687 A1* | 11/2004 | Miyamoto | A63F 13/10 463/30 |
| 2004/0242326 A1* | 12/2004 | Fujisawa | A63F 13/332 463/42 |
| 2005/0043076 A1* | 2/2005 | Lin | A63F 9/24 463/9 |
| 2005/0059483 A1* | 3/2005 | Borge | A63F 13/65 463/29 |
| 2005/0177428 A1* | 8/2005 | Ganz | G06Q 30/0258 705/16 |
| 2005/0222906 A1* | 10/2005 | Chen | G06Q 30/0224 705/14.27 |
| 2005/0229116 A1* | 10/2005 | Endler | G06F 3/0482 715/822 |
| 2005/0250415 A1* | 11/2005 | Barthold | A63H 17/00 446/465 |
| 2005/0250416 A1* | 11/2005 | Barthold | A63F 1/04 446/465 |
| 2006/0001645 A1* | 1/2006 | Drucker | G06F 3/0354 345/156 |
| 2006/0040738 A1* | 2/2006 | Okazaki | A63F 13/5378 463/32 |
| 2006/0048064 A1* | 3/2006 | Vronay | G06F 9/451 715/764 |
| 2006/0082068 A1* | 4/2006 | Patchen | A63F 13/335 463/40 |
| 2006/0093142 A1* | 5/2006 | Schneier | A63F 13/71 713/168 |
| 2006/0160594 A1* | 7/2006 | Brase | G09B 7/02 463/9 |
| 2006/0172787 A1* | 8/2006 | Ellis | A63F 13/92 463/41 |
| 2006/0224971 A1* | 10/2006 | Paulin | G06Q 30/02 705/52 |
| 2006/0242234 A1* | 10/2006 | Counts | H04W 4/08 709/204 |
| 2006/0271433 A1* | 11/2006 | Hughes | G06Q 99/00 463/16 |
| 2006/0285441 A1* | 12/2006 | Walker | A61J 7/04 368/10 |
| 2006/0293103 A1* | 12/2006 | Mendelsohn | G06Q 30/02 463/42 |
| 2007/0021203 A1* | 1/2007 | Edwards | A63F 13/10 463/30 |
| 2007/0033107 A1* | 2/2007 | Ubale | A63F 13/71 463/9 |
| 2007/0050716 A1* | 3/2007 | Leahy | H04L 67/306 715/706 |
| 2007/0073582 A1* | 3/2007 | Jung | G06Q 30/0252 705/14.5 |
| 2007/0082720 A1* | 4/2007 | Bradbury | A63F 13/10 463/43 |
| 2007/0088656 A1* | 4/2007 | Jung | G06Q 30/018 705/38 |
| 2007/0099685 A1* | 5/2007 | Van Luchene | G06Q 20/108 463/1 |
| 2007/0111770 A1* | 5/2007 | Van Luchene | G07F 17/3255 463/7 |
| 2007/0112624 A1* | 5/2007 | Jung | G06Q 30/0267 705/14.66 |
| 2007/0124673 A1* | 5/2007 | Trotto | G06F 1/1626 715/209 |
| 2007/0130001 A1* | 6/2007 | Jung | G06Q 30/0209 705/14.12 |
| 2007/0218965 A1* | 9/2007 | Tilston | A63F 13/10 463/2 |
| 2007/0218966 A1* | 9/2007 | Tilston | A63F 13/837 463/5 |
| 2007/0226062 A1* | 9/2007 | Hughes | G06Q 30/0212 463/9 |
| 2007/0287133 A1* | 12/2007 | Schubert | F41G 3/26 434/11 |
| 2007/0293313 A1* | 12/2007 | Shimizu | A63F 13/52 463/31 |
| 2008/0009350 A1* | 1/2008 | Ganz | G06Q 30/0643 463/42 |
| 2008/0009351 A1* | 1/2008 | Ganz | G06Q 30/0236 463/42 |
| 2008/0077595 A1* | 3/2008 | Leebow | G06F 3/048 |
| 2008/0109313 A1* | 5/2008 | Ganz | A63F 9/24 705/14.23 |
| 2008/0115087 A1* | 5/2008 | Rollin | G06Q 10/107 707/999.1 |
| 2008/0122796 A1* | 5/2008 | Jobs | H04M 1/72403 345/173 |
| 2008/0134099 A1* | 6/2008 | Ganz | G06Q 30/0276 707/999.009 |
| 2008/0139265 A1* | 6/2008 | Hardin | A63F 13/08 463/7 |
| 2008/0163055 A1* | 7/2008 | Ganz | G06Q 30/0643 715/706 |
| 2008/0215973 A1* | 9/2008 | Zalewski | A63F 13/77 715/706 |
| 2008/0221998 A1* | 9/2008 | Mendelsohn | G06Q 30/0226 705/14.12 |
| 2008/0222295 A1* | 9/2008 | Robinson | G06F 16/954 709/227 |
| 2008/0254882 A1* | 10/2008 | Watanabe | A63F 13/55 463/31 |
| 2008/0280684 A1* | 11/2008 | McBride | A63F 13/12 463/42 |
| 2009/0029772 A1* | 1/2009 | Ganz | G07F 17/32 463/31 |
| 2009/0053970 A1* | 2/2009 | Borge | A63H 13/02 446/268 |
| 2009/0054155 A1* | 2/2009 | Borge | A63F 13/12 446/268 |
| 2009/0055749 A1* | 2/2009 | Chatterjee | G06F 3/04817 715/738 |
| 2009/0063282 A1* | 3/2009 | Ganz | G06Q 30/0643 705/14.23 |
| 2009/0069084 A1* | 3/2009 | Reece | A63F 13/335 463/32 |
| 2009/0125819 A1* | 5/2009 | Hamilton, II | A63F 13/12 715/757 |
| 2009/0131164 A1* | 5/2009 | Ganz | A63H 33/00 463/43 |
| 2009/0144638 A1* | 6/2009 | Haggar | H04L 67/131 715/757 |
| 2009/0191968 A1* | 7/2009 | Johnson | A63F 13/5375 463/43 |
| 2009/0204420 A1* | 8/2009 | Ganz | A63H 3/36 715/757 |
| 2009/0217211 A1* | 8/2009 | Hildreth | G06F 3/0304 715/863 |

(56) References Cited

U.S. PATENT DOCUMENTS

| | | | | |
|---|---|---|---|---|
| 2009/0221367 | A1* | 9/2009 | Longley | G07F 17/3276 463/32 |
| 2009/0247250 | A1* | 10/2009 | Kato | A63F 13/837 463/2 |
| 2009/0253517 | A1* | 10/2009 | Bererton | A63F 13/71 463/43 |
| 2009/0254843 | A1* | 10/2009 | Van Wie | G06T 19/20 707/999.005 |
| 2009/0303175 | A1* | 12/2009 | Koivunen | G06F 3/04842 345/156 |
| 2009/0307620 | A1* | 12/2009 | Hamilton, II | A63F 13/12 715/764 |
| 2009/0313084 | A1* | 12/2009 | Chugh | G06Q 30/02 705/14.12 |
| 2010/0105484 | A1* | 4/2010 | Horneff | A63F 13/79 463/43 |
| 2010/0134484 | A1* | 6/2010 | Chen | G06T 17/05 706/58 |
| 2010/0151940 | A1* | 6/2010 | Borge | A63F 13/73 463/29 |
| 2010/0151948 | A1* | 6/2010 | Vance | A63F 13/10 463/43 |
| 2010/0174593 | A1* | 7/2010 | Cao | G06Q 30/0242 705/14.12 |
| 2010/0210333 | A1* | 8/2010 | Halash | A63F 13/63 463/43 |
| 2010/0280965 | A1* | 11/2010 | Vesterinen | G06Q 10/10 709/204 |
| 2010/0306671 | A1* | 12/2010 | Mattingly | H04N 21/6587 715/834 |
| 2010/0306702 | A1* | 12/2010 | Warner | G06F 3/0482 715/834 |
| 2011/0092128 | A1* | 4/2011 | Ganz | G06Q 30/02 446/72 |
| 2011/0171934 | A1* | 7/2011 | Lim | H04M 1/72448 455/566 |
| 2011/0179180 | A1* | 7/2011 | Schleifer | H04L 65/1069 709/227 |
| 2011/0183301 | A1* | 7/2011 | Turner | G09B 9/302 434/43 |
| 2011/0207525 | A1* | 8/2011 | Allen | G07F 17/32 463/25 |
| 2012/0075336 | A1* | 3/2012 | Oda | G06T 11/60 345/629 |
| 2013/0141551 | A1* | 6/2013 | Kim | H04N 5/445 348/51 |
| 2014/0126758 | A1* | 5/2014 | Van Der Wijst | H04S 7/303 381/310 |
| 2014/0172432 | A1* | 6/2014 | Sendai | G02B 27/0172 704/276 |
| 2014/0294183 | A1* | 10/2014 | Lee | G06F 3/165 381/56 |
| 2014/0379108 | A1* | 12/2014 | Vesa | G06F 3/165 700/94 |
| 2015/0286275 | A1* | 10/2015 | Huang | A63F 13/843 345/156 |
| 2016/0054807 | A1* | 2/2016 | Flagg | G06F 3/0346 345/158 |
| 2016/0064002 | A1* | 3/2016 | Kim | G01S 3/8083 704/246 |
| 2016/0080650 | A1* | 3/2016 | Okazawa | H04N 5/23229 348/36 |
| 2016/0098138 | A1* | 4/2016 | Park | G06F 1/1686 345/173 |
| 2016/0142830 | A1* | 5/2016 | Hu | G06T 11/60 381/313 |
| 2016/0199729 | A1* | 7/2016 | Wang | H04N 13/363 348/53 |
| 2016/0313973 | A1* | 10/2016 | Yajima | G06F 3/165 |
| 2017/0061813 | A1* | 3/2017 | Tao | G09B 9/08 |
| 2017/0340959 | A1* | 11/2017 | Tang | A63F 13/426 |
| 2017/0354884 | A1* | 12/2017 | Benedetto | A63F 13/493 |
| 2017/0354892 | A1* | 12/2017 | Benedetto | A63F 13/31 |
| 2018/0036636 | A1* | 2/2018 | Lee | A63F 13/26 |
| 2018/0048976 | A1* | 2/2018 | Kimura | H04S 7/303 |
| 2018/0084367 | A1* | 3/2018 | Greff | G06F 3/165 |
| 2018/0104591 | A1* | 4/2018 | Fukuda | G06F 3/0488 |
| 2018/0256977 | A1* | 9/2018 | Wakasono | A63F 13/5378 |
| 2019/0060758 | A1* | 2/2019 | Ge | A63F 13/533 |
| 2019/0099673 | A1* | 4/2019 | Shao | A63F 13/54 |
| 2019/0126151 | A1* | 5/2019 | Li | A63F 13/54 |
| 2020/0302948 | A1* | 9/2020 | Gossard | H04R 3/04 |
| 2020/0353361 | A1* | 11/2020 | Wang | A63F 13/5378 |

FOREIGN PATENT DOCUMENTS

| | | | | |
|---|---|---|---|---|
| CN | 107992252 A | | 5/2018 | |
| CN | 107992281 A | | 5/2018 | |
| CN | 108854069 A | | 11/2018 | |
| EP | 3 300 392 A1 | * | 3/2018 | .............. H04S 1/00 |
| EP | 3300392 B1 | | 3/2018 | |
| JP | 2012-55490 A | | 3/2012 | |
| JP | 2017-55935 A | | 3/2017 | |
| WO | 2013/114831 A1 | | 8/2013 | |
| WO | WO 2013/114831 A1 | * | 8/2013 | .............. H04S 7/00 |

OTHER PUBLICATIONS

Machine translation of CN 107890672 A, downloaded from espacenet. com on Sep. 14, 2021.*
Machine translation of CN 107469354 A, downloaded from espacenet. com on Sep. 14, 2021.*
Machine translation of CN 108854069 A, downloaded from espacenet. com on Sep. 14, 2021.*
Machine translation of ON 107992252 A, downloaded from espacenet. com on Sep. 14, 2021.*
English translation of International Search Report dated Jun. 28, 2019 in International Application No. PCT/CN2019/081259.
Chinese Office Action dated Aug. 16, 2019 in Chinese Application No. 2019081301671340.
Office Action issued on Japanese Application 2020-551314 dated Nov. 2, 2021, 5 pages.
Translation of Office Action for Japanese Application 2020-551314.
Second Office Action issued on Japanese Application 2020-551314 dated Jun. 21, 2022, 3 pages.
Notice of Preliminary Rejection issued on Korean Application 10-2020-702776 dated Mar. 14, 2022, with comments.

* cited by examiner

SOUND SOURCE DETERMINING METHOD AND APPARATUS, AND STORAGE MEDIUM

RELATED APPLICATION

This application is a continuation application of PCT Patent Application No. PCT/CN2019/081259, filed on Apr. 3, 2019, which claims priority to Chinese Patent Application No. 2018105324132, filed with the China Patent Office on May 29, 2018 and entitled "SOUND SOURCE DETERMINING METHOD AND APPARATUS, STORAGE MEDIUM, AND ELECTRONIC APPARATUS", wherein the entirety of each of the above-referenced applications is incorporated in this application by reference in its entirety.

FIELD OF THE TECHNOLOGY

This application relates to the field of computers, and specifically, to a sound source determining technology.

BACKGROUND OF THE DISCLOSURE

In some terminal applications, a sound made by a virtual object may be simulated in a virtual scene, so that a user participating in the virtual scene determines a position of a sound source object in the virtual scene by hearing, and then completes a task that is configured in the virtual scene and that interacts with the sound source object.

However, the sound played in the virtual scene is usually simulated by a machine. Consequently, accuracy of the sound cannot be guaranteed. As a result, there may be a problem that the sound source object cannot be accurately determined in a process of determining the sound source object only according to the simulated sound.

For the foregoing problem, no effective solution has been put forward so far.

SUMMARY

Embodiments of this application provide a sound source determining method and apparatus, a storage medium and an electronic apparatus, to enable a user to accurately determine a position of a sound source virtual object in a virtual scene.

An aspect of the embodiments of this application provides a method for determining characteristics of a sound source, including: acquiring a first position of a first virtual role controlled by an application client in a virtual scene; detecting, in a sound source detection area associated with the first position, a second position of a sound source virtual object in the virtual scene; determining transparency of a position mark that matches the sound source virtual object, according to a sound source distance between the first position and the second position, the position mark identifying the second position of the sound source virtual object; and displaying, on an interaction interface of the application client, the position mark of the sound source virtual object according to the transparency.

Another aspect of the embodiments of this application further provides an apparatus for determining characteristics of a sound source, including a memory operable to store program code and a processor operable to read the program code. The processor is configured to: acquire a first position of a first virtual role controlled by an application client in a virtual scene; detect, in a sound source detection area associated with the first position, a second position of a sound source virtual object in the virtual scene; determine transparency of a position mark that matches the sound source virtual object, according to a sound source distance between the first position and the second position, the position mark identifying the second position of the sound source virtual object; and display, on an interaction interface of the application client, the position mark of the sound source virtual object according to the transparency.

Still another aspect of the embodiments of this application further provides a non-transitory machine-readable media, having instructions stored on the machine readable media. The instructions are configured to, when executed, cause a machine to: acquire a first position of a first virtual role controlled by an application client in a virtual scene; detect, in a sound source detection area associated with the first position, a second position of a sound source virtual object in the virtual scene; determine transparency of a position mark that matches the sound source virtual object, according to a sound source distance between the first position and the second position, the position mark identifying the second position of the sound source virtual object; and display, on an interaction interface of the application client, the position mark of the sound source virtual object according to the transparency.

Still another aspect of the embodiments of this application further provides an electronic apparatus, including a memory, a processor, and a computer program that is stored on the memory and can be run on the processor, the processor being configured to perform the sound source determining method through the computer program.

Still another aspect of the embodiments of this application further provides a computer program product that includes an instruction, the instruction, when being run on a computer, causing the computer to perform the sound source determining method.

In the sound source determining method provided by the embodiments of this application, a first position of a first virtual role controlled by an application client in a virtual scene is acquired; a second position of a sound source virtual object in the virtual scene is detected in a sound source detection area associated with the first position; transparency of a position mark that matches the sound source virtual object is determined according to a sound source distance between the first position and the second position, the position mark being used for identifying the second position of the sound source virtual object; and the position mark of the sound source virtual object is displayed on an interaction interface of the application client according to the transparency. In the foregoing method, after requiring the second position of the sound source virtual object in the virtual scene, the transparency may be determined according to the distance between the first position of the first virtual role and the second position, and then the position mark of the sound source virtual object is displayed on the interaction interface according to the transparency, so that the user does not determine a position of the sound source virtual object in the virtual scene only by a simulated sound any more, and even if the user is in a noisy environment, the noisy environment has no impact on accurately determining, by the user, the position of the sound source virtual object in the virtual scene, which resolve a problem that the accuracy of the position of the sound source virtual object cannot be guaranteed by determining the position of the sound source virtual object only according to the simulated sound in the virtual scene.

BRIEF DESCRIPTION OF THE DRAWINGS

The accompanying drawings described herein are used for providing further understanding of this application, and constitute a part of this application. Exemplary embodiments of this application and descriptions thereof are used for explaining this application and do not constitute any improper limitation to this application. In the accompanying drawings.

DESCRIPTION OF EMBODIMENTS

To make a person skilled in the art better understand solutions of this application better, the following clearly and completely describes the technical solutions in the embodiments of this application with reference to the accompanying drawings in the embodiments of this application. Apparently, the described embodiments are merely some of the embodiments rather than all of the embodiments of this application. All other embodiments obtained by a person skilled in the art based on the embodiments of this application without creative efforts shall fall within the protection scope of this application.

In the specification, claims, and accompanying drawings of this application, the terms "first", "second", and so on are intended to distinguish between similar objects rather than indicating a specific order. It is to be understood that the data termed in such a way are interchangeable in proper circumstances so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

Figure 1:
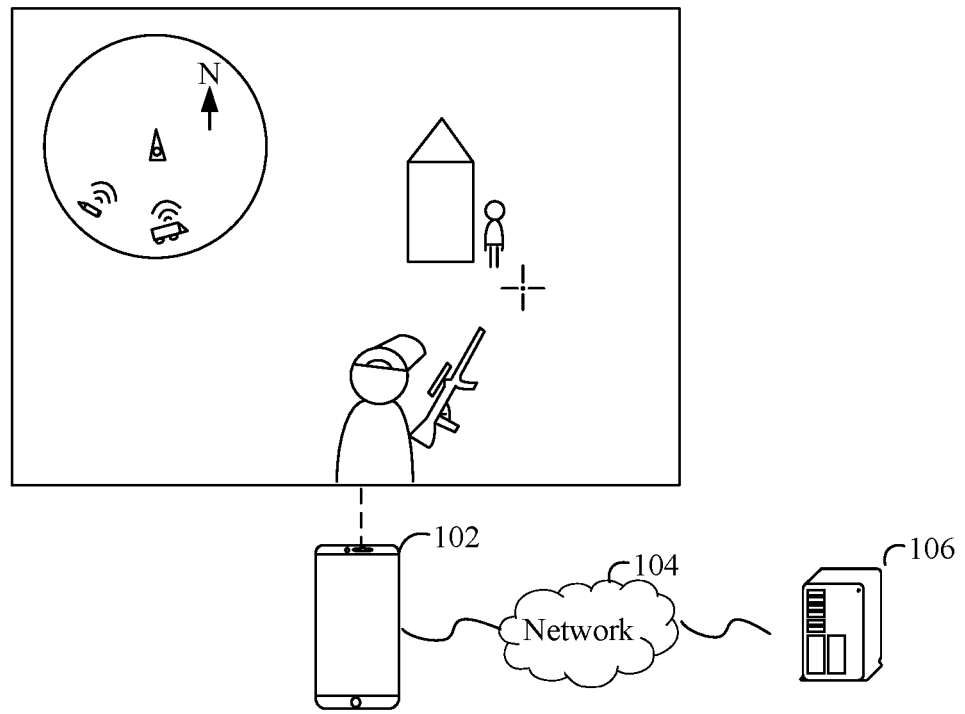
FIG. 1 is a schematic diagram of an application environment of a sound source determining method according to an embodiment of this application.

According to an aspect of the embodiments of this application, a sound source determining method is provided. In an optional implementation, the sound source determining method may be applied to, but is not limited to, an environment shown in FIG. 1.

In a process that an application client 102 interacts with a server 106 through a network 104, the application client 102 acquires a first position of a first virtual role controlled by the application client in a virtual scene and detects, in a sound source detection area associated with the first position, a second position of a sound source virtual object in the virtual scene; after detecting the second position, determines transparency of a position mark that matches the sound source virtual object, according to a sound source distance between the first position and the second position; and after determining the transparency of the position mark, displays the position mark of the sound source virtual object according to the transparency.

In the related technology, in a process of running the application client in a mobile terminal, a user usually determines a position of the sound source virtual object in the virtual scene according to a simulated sound. However, a source direction and a position of the simulated sound are indefinite. Consequently, the user is usually unable to accurately determine the position of the sound source virtual object in the virtual scene according to the simulated sound, and especially in a case that the user is currently in a noisy environment, it is even difficult for the user to clearly hear the simulated sound. Correspondingly, it is more difficult for the user to accurately determine the position of sound source virtual object in the virtual scene.

In this embodiment, after acquiring the second position of the sound source virtual object in the virtual scene, the transparency of the position mark may be determined according to the distance between the first position of the first virtual role and the second position and then the position mark of the sound source virtual object is displayed according to the transparency, that is, locating information of the sound source virtual object is displayed on the interaction interface of the application client; the method informs the user of the position of the sound source virtual object in the virtual scene by displaying the position mark in the virtual scene and the user does not determine the position of the sound source virtual object in the virtual scene only by the simulated sound any more. By contrast, this application can more intuitively inform the user of the position of the sound source virtual object, which resolves the problem of low accuracy of the locating information of the determined sound source virtual object in related art and improves accuracy of the locating information of the sound source virtual object.

Optionally, the sound source determining method may be applied to, but is not limited to, a terminal that can calculate data, such as a mobile phone, a tablet computer, a notebook computer, a PC, or the like. The network may include, but is not limited to, a wireless network or a wired network. The wireless network includes: Bluetooth, Wi-Fi, and other network implementing wireless communication. The wired network may include, but is not limited to, a wide area network, a metropolitan area network and a local area network. The server may include, but is not limited to, any hardware device that can do data calculation.

Figure 2:
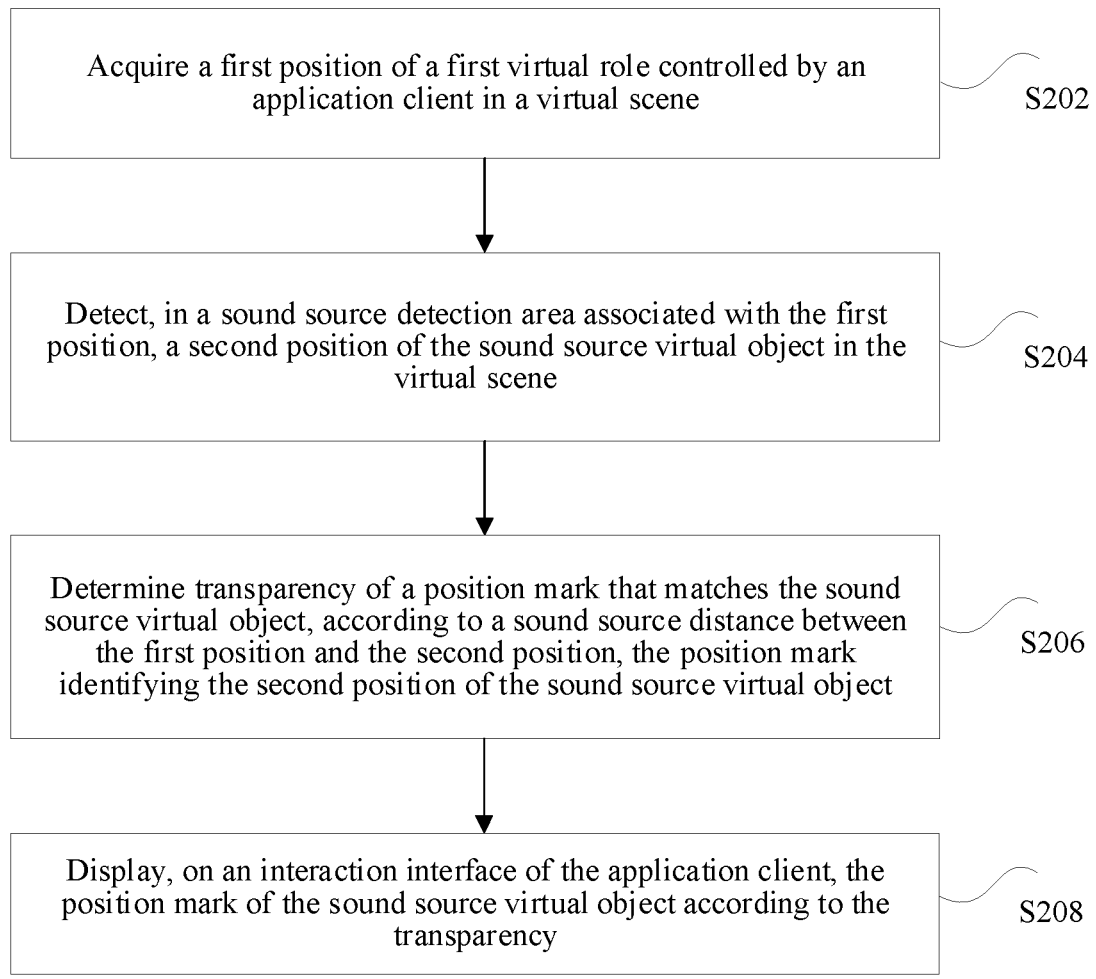
FIG. 2 is a schematic flowchart of an optional sound source determining method according to an embodiment of this application.

Optionally, in an optional implementation, as shown in FIG. 2, the sound source determining method includes:

S202. Acquire a first position of a first virtual role controlled by an application client in a virtual scene.

S204. Detect, in a sound source detection area associated with the first position, a second position of the sound source virtual object in the virtual scene.

S206. Determine transparency of a position mark that matches the sound source virtual object, according to a sound source distance between the first position and the second position, the position mark identifying the second position of the sound source virtual object.

S208. Display, on an interaction interface of the application client, the position mark of the sound source virtual object according to the transparency.

Optionally, the sound source determining method may be applied, but not limited to a field of games or a field of simulation training. The following describes the sound source determining method with reference to the field of games. The first virtual role may include, but is not limited to, a game role controlled by the user and the sound source virtual object may include, but is not limited to, an object that may make sounds in a game. The position mark may be an icon that is displayed on a client and is indicating the position of the sound source virtual object. In a process of the game, when the object that makes sounds is detected within a sound source detection range of the game role controlled by the user, the transparency of the icon is determined according to a distance between the object that makes sounds and the game role controlled by the user. The icon of the transparency is displayed on a display interface of the client according to the determined transparency of the icon.

Figure 3:
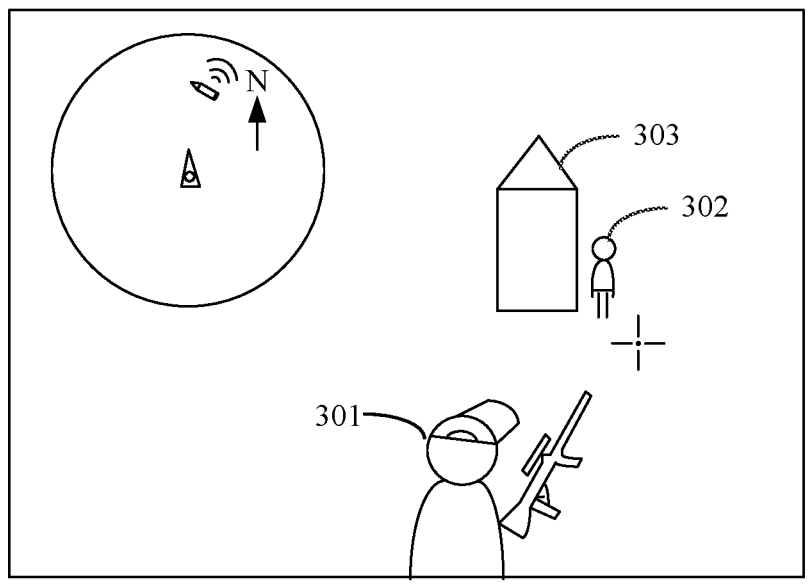
FIG. 3 is a schematic diagram of an optional sound source determining method according to an embodiment of this application.

For example, descriptions are provided below with reference to FIG. 3. As shown in FIG. 3, when a current user is playing a game, a front game object 302 being near a house 303 and controlled by another user is located within a sound source detection range of a game object 301 controlled by the current user. When the game object 302 near the house 303 makes a sound, for example, a gun sound, transparency of an icon that is indicating a position of the game object near the house is determined according to a distance between the game object controlled by the current user and the game object near the house and the icon is displayed on a client according to the transparency.

In this embodiment of this application, after acquiring the second position of the sound source virtual object in the virtual scene, the transparency of the position mark of the sound source virtual object may be determined according to the distance between the first position of the first virtual role and the second position, and then the position mark is displayed according to the transparency, so that locating information of the sound source virtual object is displayed on the application client; the method informs the user of the position of the sound source virtual object in the virtual scene by displaying the position mark in the virtual scene and the user does not determine the position of the sound source virtual object in the virtual scene only by the simulated sound any more. By contrast, this application can more intuitively inform the user of the position of the sound source virtual object, which resolves the problem of low accuracy of the locating information of the sound source virtual object determined by the user and improves accuracy of the locating information of the sound source virtual object.

In an optional implementation, the determining the transparency of the position mark that matches the sound source virtual object, according to the sound source distance between the first position and the second position includes:

S1. Acquire a detection radius of the sound source detection area that matches the sound source virtual object.

S2. Determine the transparency according to a ratio of the sound source distance to the detection radius, in a case that the ratio decreases, the transparency being decreased; and in a case that the ratio increases, the transparency being increased.

Figure 4:
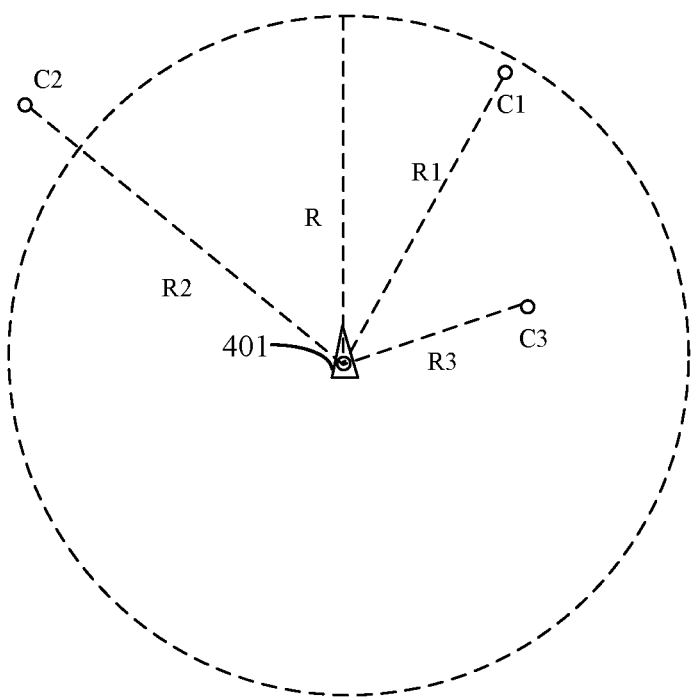
FIG. 4 is a schematic diagram of another optional sound source determining method according to an embodiment of this application.

Optionally, a description is provided still with reference to the field of games. As shown in FIG. 4, a detection radius of a role 401 controlled by a user in a game is R, an object C1 that can make sounds and an object C2 that can make sounds are in the detection radius. A ratio of a distance between the C1 and a game role 401 controlled by the user to the detection radius is R1/R, a ratio of a distance between C3 and the game role 401 controlled by the user to the detection radius is R3/R, and R1/R is larger than R3/R, so that transparency of a position mark of the C1 is greater than transparency of a position mark of the C3, that is, a display effect of the position mark of the C1 is more transparent than that of the position mark of the C3. The object C2 that can make sounds is out of the detection radius of the game role 401 controlled by the user, so that a ratio of a distance between the C2 and the game role 401 controlled by the user to the detection radius is larger than 1. In a case that the ratio of the sound source distance to the detection radius is larger than or equal to 1, the transparency of the position mark may be 100%, so that the position mark is completely transparent and cannot be seen by the user.

In this embodiment, by determining the transparency according to the ratio of the sound source distance to the detection radius, the position mark of the sound source virtual object that is farther away from the first position may be made more apparent, thereby accurately determining the position of the sound source virtual object and improving the sound source determining accuracy.

In an optional implementation, the acquiring a detection radius of a sound source detection area that matches the sound source virtual object includes:

S1. Acquire a sound source type of a sound made by the sound source virtual object and an environment identifier of an environment in which the sound source virtual object is located.

S2. Determine the detection radius according to the sound source type and the environment identifier.

Figure 5:
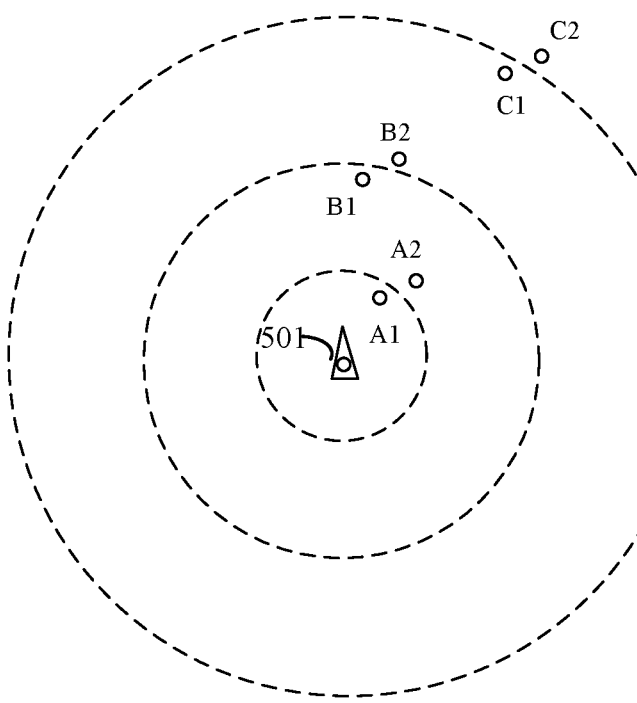
FIG. 5 is a schematic diagram of still another optional sound source determining method according to an embodiment of this application.

Optionally, the detection radius of the sound source detection area correspondingly changes for different sound source types. For example, a description is provided still with reference to the field of games. As shown in FIGS. 5, A1 and A2 are positions where sounds of opening and closing the door are made. A smallest dashed-line circle in FIG. 5 is a range that can detect the sounds of opening and closing the door, so that the sounds of opening and closing the door in the position A1 can be detected by a game role 501 controlled by the user and be displayed on a client of a first virtual object, while the sounds of opening and closing the door in the position A2 cannot be detected by the game role 501. Likewise, B1 and B2 are positions where gun sounds are made. A middle dashed-line circle in FIG. 5 is a range that can detect the gun sounds, and therefore the gun sounds made in the position B1 can be detected by the game role 501, while the gun sounds made in the position B2 cannot be detected by the game role 501. Likewise, C1 and C2 are positions where sounds of airdrops are made. A biggest dashed-line circle in FIG. 5 is a range that can detect the sounds of airdrops, the sounds of airdrops in the position C1 can be detected by the game role 501, and the sounds of airdrops in the position C2 cannot be detected by the game role 501.

In addition, different environments may affect the detection radius of the sound source detection area. For example, in the same case of detecting gun sounds, a detection radius in sunny days is different from a detection radius in rainy days. Therefore, the detection radius may be further adjusted according to the environment identifier of the environment when determining the detection radius. For example, different coefficients may be set for different environment identifiers. The detection radius in a current environment may be determined according to the detection radius and the coefficients of the environment identifiers when the environment identifiers are different.

Different detection radii of sound source detection areas may be preset for different sound source types. Alternatively, for a part of the different sound source types, the detection radii of the sound source detection areas, corresponding to the sound source types, may be set to be the same.

In this embodiment, the detection radius is determined according to the sound source type of the sound made by the sound source virtual object and the environment identifier of the environment in which the sound source virtual object is located, thereby increasing flexibility of displaying a position mark while improving accuracy of the sound source position determining.

In an optional implementation, the determining the detection radius according to the sound source type and the environment identifier includes:

S1. Acquire an initial detection radius configured for the sound source type, a frequency of a sound indicated by the sound source type being inversely proportional to the initial detection radius.

S2. Acquire a sound triggering threshold that matches the environment identifier.

S3. Decrease the initial detection radius according to the sound triggering threshold, to obtain the detection radius.

For example, a description is provided still with reference to the field of games. In a process of playing the game, an initial value of the detection radius in which a game role controlled by a user detects the sound source virtual object needs to be set. The initial value can be decided by the frequency of the sound made by the sound source virtual object. For example, when frequencies of a detection radius of detecting a gun sound and a detection radius of detecting sounds of opening and closing the door are different, a sound with a smaller frequency corresponds to a bigger detection radius. Then, the environment in which the game role controlled by the user is currently located is determined, the sound triggering threshold corresponding to the environment identifier is determined according to the environment identifier corresponding to the environment, and the initial detection radius determined according to the sound source type is correspondingly decreased according to the sound triggering threshold, so as to obtain the detection radius corresponding to the sound source type and the environment identifier.

In this embodiment, by acquiring the initial detection radius and decreasing the detection radius according to the sound triggering threshold matching the environment identifier, the initial detection radius may be adjusted according to different environments, thereby improving accuracy of the display position determining.

In an optional implementation, the displaying, on an interaction interface of the application client, the position mark of the sound source virtual object according to the transparency includes:

S1. Acquire a sound source type of a sound made by the sound source virtual object.

S2. Display the position mark of the sound source virtual object that matches the sound source type.

Figure 6:
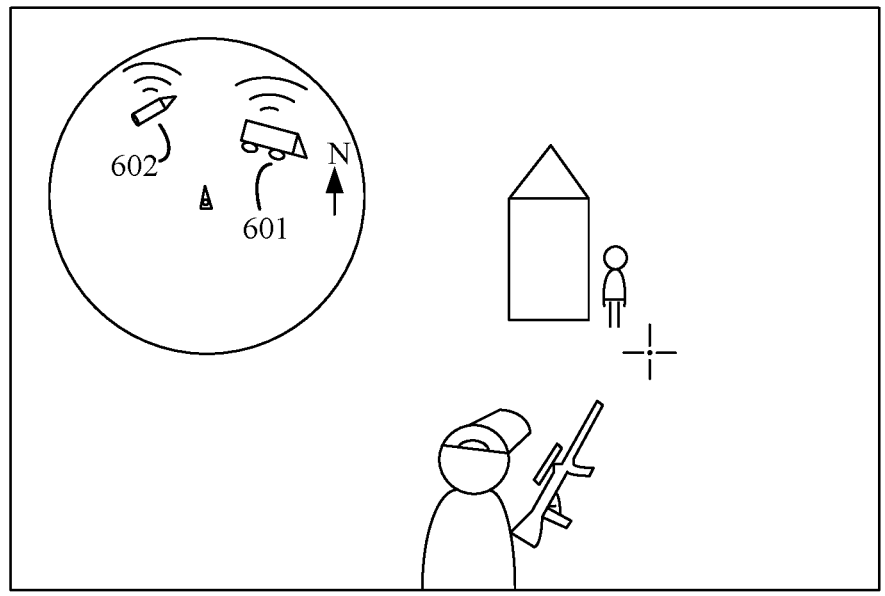
FIG. 6 is a schematic diagram of still another optional sound source determining method according to an embodiment of this application.

For example, a description is provided still with reference to the field of games. As shown in FIG. 6, sounds made by objects that can make sounds are not necessarily the same. For example, when a car makes an engine sound, a corresponding position of the car may be marked as a car icon 601 correspondingly; when shooting makes a gun sound, a corresponding position of the gun sound is marked as a bullet icon 602 correspondingly.

In this embodiment, by determining the position mark according to the sound source type of the sound made by the sound source virtual object, it is convenient for a user to accurately determine the sound source type according to the position mark, thereby improving the sound source determining accuracy.

In an optional implementation, the displaying the position mark of the sound source virtual object that matches the sound source type includes at least one of the following:

S1. Display the position mark according to a color that matches the sound source type.

S2. Display the position mark according to a shape that matches the sound source type.

S3. Display the position mark according to an identifier that matches the sound source type.

For example, a description is provided still with reference to the field of games. When displaying the position mark, different colors and shapes or identifiers may be used for displaying. For example, the position marks in different colors can indicate rapid degrees of the sounds. For example, for gun sounds, bullet identifiers indicate the gun sounds, while red bullet identifiers indicate rapid gun sounds and white bullet identifiers indicate non-rapid gun sounds. Alternatively, the position marks in different shapes can indicate the rapid degrees of sounds. For example, bullet identifiers of submachine guns indicate rapid gun sounds and bullet identifiers of sniper rifles indicate non-rapid gun sounds.

In this embodiment, using different colors and shapes to adjust the position marks, the user knows the sound source type of the sound made by the sound source virtual object according to different display solutions, thereby increasing flexibility of displaying a position mark while improving the sound source determining accuracy.

In an optional implementation, the displaying the position mark of the sound source virtual object that matches the sound source type includes at least one of the following:

S1. Display, at the second position in a map displayed on the interaction interface of the application client, the position mark of the sound source virtual object.

S2. Display, in a direction corresponding to the second position in a universal wheel displayed on the interaction interface of the application client, the position mark of the sound source virtual object.

For example, a description is provided still with reference to the field of games. When the position mark is displayed on the interaction interface, the position mark may be displayed in the map or the position mark may be displayed in the universal wheel. The universal wheel may be a wheel with directions.

In this embodiment, by displaying the position mark in the map of the interaction interface, or displaying the position mark in a universal wheel of the interaction interface, a main interface of the interaction interface may not be blocked, thereby improving use experience of the user while improving the sound source determining accuracy.

In an optional implementation, the displaying the position mark of the sound source virtual object that matches the sound source type includes:

S1. Adjust a display range of the position mark in a case that the sound source virtual object is equipped with a silencing apparatus, the display range of the position mark of the sound source virtual object equipped with the silencing apparatus being larger than a display range of the position mark of the sound source virtual object not equipped with the silencing apparatus.

Figure 7:
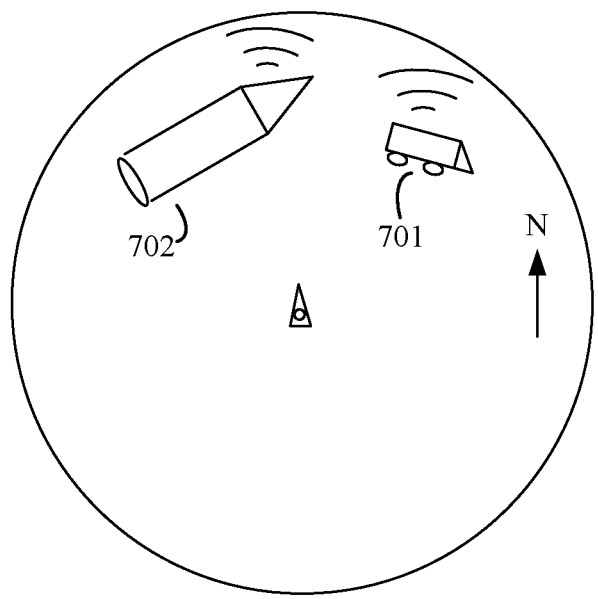
FIG. 7 is a schematic diagram of still another optional sound source determining method according to an embodiment of this application.

For example, a description is provided still with reference to the field of games. As shown in FIG. 7, FIG. 7 is a situation where a sound source virtual object equipped with the silencing apparatus is displayed in a mini-map. When a car makes sounds in a detection radius, a position mark of the car is displayed in the mini-map after transparency of the position mark of the car is determined. However, after a gun equipped with the silencing apparatus makes sounds in the detection radius, the gun is equipped with the silencer, so that after transparency of the position mark of the gun making sounds is determined, a position mark of the gun is enlarged and then displayed in the mini-map when the position mark of the gun is displayed in the mini-map.

In this embodiment, in a case of being equipped with the silencing apparatus, the display range of the position mark is adjusted, thereby increasing flexibility of displaying the position mark while improving the sound source determining accuracy.

In an optional implementation, the displaying the position mark of the sound source virtual object according to the transparency includes:

S1. Display, in a case that a plurality of sound source virtual objects are detected and the plurality of sound source virtual objects are located in different directions of the first virtual role, respective position marks of the plurality of sound source virtual objects according to transparency of the position marks that respectively match the plurality of sound source virtual objects.

For example, a description is provided still with reference to the field of games. In a process of the game, when a plurality of objects that make sounds are detected by a game role controlled by a user, each sound source virtual object is displayed by the position mark if the sounds are distributed in different directions.

The sound source virtual objects have a control threshold, and when the number of the detected sound source virtual objects is more than the control threshold, position marks corresponding to some sound source virtual objects may not be displayed.

In this embodiment, by displaying the position marks of the sound source virtual objects in different directions at the same time, the plurality of sound source virtual objects are displayed at the same time, thereby making the user know positions of the plurality of sound source virtual objects in a virtual environment at the same time, while improving the sound source determining accuracy.

In an optional implementation, the displaying the position mark of the sound source virtual object according to the transparency includes:

S1. Acquire a sound triggering start moment of each sound source virtual object in a plurality of sound source virtual objects, in a case that the plurality of sound source virtual objects are detected and the plurality of sound source virtual objects are located in the same direction of the first virtual role.

S2. Acquire, in sequence, a triggering time interval of the sound triggering start moments of the two adjacent sound source virtual objects.

S3. Determine, in sequence, the transparency of the position mark that matches each sound source virtual object in the two adjacent sound source virtual objects, in a case that the triggering time interval is greater than a first threshold; and display, in sequence, the position marks of the two adjacent sound source virtual objects according to the determined transparency.

S4. Determine, in a case that the triggering time interval is less than the first threshold, transparency of a position mark that matches a target sound source virtual object whose sound triggering start moment is later of the two adjacent sound source virtual objects; and display the position mark of the target sound source virtual object according to the determined transparency.

For example, a description is provided still with reference to the field of games. If a plurality of sounds are detected by a role controlled by a user and the plurality of sound source virtual objects making the plurality of sounds are located in the same direction of the game role controlled by the user, when intervals between the plurality of sounds are larger than the specified first threshold, the position marks of the sound source virtual objects respectively corresponding to the sounds are displayed in sequence according to a sequence of detecting the sounds. However, if the intervals between the sounds are smaller than the first threshold, the position mark corresponding to the late detected sound needs to be used to replace the position mark of the early detected sound according to the times of detecting the sounds.

Optionally, the first threshold may be a display cycle of the position mark corresponding to the early detected sound.

Figure 8:
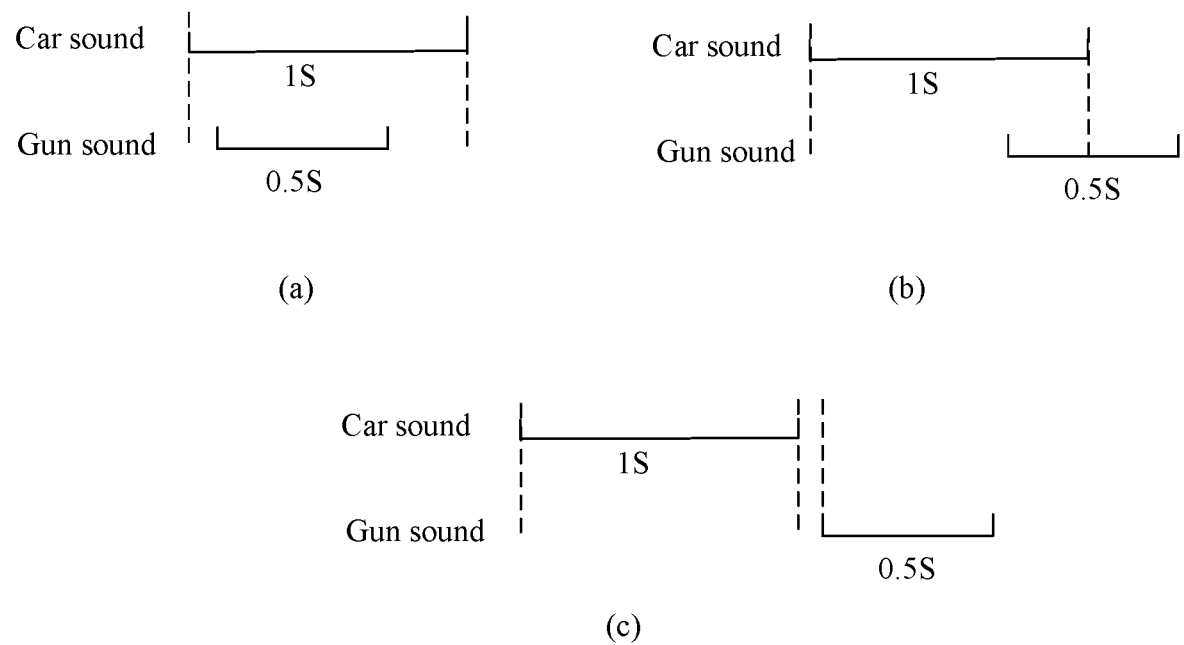
FIG. 8 is a schematic diagram of still another optional sound source determining method according to an embodiment of this application.

Descriptions are provided in the following with reference to FIG. 8. A gun sound and a car sound that are detected are located in the same direction. As shown in FIG. 8, a situation (a) in FIG. 8 is that a car sound is early detected and a gun sound is late detected, and a display cycle of the gun sound is in a display cycle of the car sound. In this case, only a position mark of the car sound is displayed. A situation (b) in FIG. 8 is that the car sound is early detected and the gun sound is late detected, and the display cycle of the position mark of the gun sound is partially in the display cycle of the position mark of the car sound. In this case, the position mark of the gun sound is displayed after the gun sound is detected while the position mark of the car sound is no longer displayed. A situation (c) in FIG. 8 is that the car sound is early detected and the gun sound is late detected, and the display cycle of the position mark of the gun sound does not overlap with the display cycle of the position mark of the car sound. In this case, the position marks of the car sound and the position mark of the gun sound are displayed in sequence according to the sequence of detecting the sounds.

In this embodiment, by the foregoing solution of displaying the position marks of the sound source virtual objects in the same direction, a situation of mutual blocking caused by displaying the plurality of position marks in the same direction at the same time may be avoided, thereby increasing efficiency of displaying the position mark while improving the sound source determining accuracy.

In an optional implementation, after the acquiring the first position of the first virtual role controlled by the application client in the virtual scene, the method further includes:

S1. Acquire a sound triggering start moment of each virtual object of a plurality of virtual objects, in a case that the plurality of virtual objects that make sounds are detected and the plurality of virtual objects are associated with the same virtual role in a sound source detection area associated with the first position.

S2. Determine a target virtual object as the sound source virtual object among the plurality of virtual objects according to the sound triggering start moment.

For example, a description is provided still with reference to the field of games. The virtual role may be a role controlled by another user in the game. When a plurality of detected sounds are made by the same game role, a position mark is selected from the position marks of the plurality of sounds and displayed. A display rule may be displaying a position mark of a first detected sound, or displaying a position mark of a last detected sound.

In this embodiment, by determining the sound source virtual object according to the sound triggering start moment, a mutual blocking problem, caused by displaying the plurality of virtual objects in the same position at the same time, may be avoided, thereby increasing efficiency of displaying the position mark while improving the sound source determining accuracy.

In an optional implementation, the displaying the position mark of the sound source virtual object according to the transparency includes:

S1. Acquire a direction mark included in the position mark of the sound source virtual object, the direction mark indicating a moving direction of the sound source virtual object relative to the first virtual role at the sound triggering start moment.

S2. Display the direction mark in a display cycle that matches the sound source virtual object.

Figure 9:
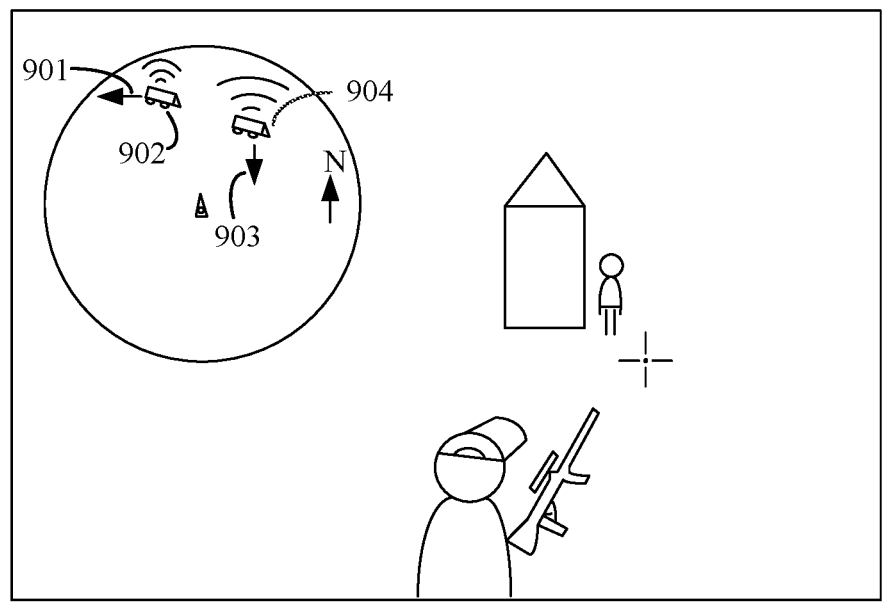
FIG. 9 is a schematic diagram of still another optional sound source determining method according to an embodiment of this application.

For example, a description is provided still with reference to the field of games. When sounds are detected, a direction mark is a moving direction of an object that makes sounds. As shown in FIG. 9, a position mark of a car sound is displayed and a moving direction of the car is displayed on an interaction interface at the same time. The moving direction will not be updated in a process of currently displaying the position mark of the car.

In this embodiment, by displaying the moving direction of the sound source virtual object, the moving direction of the sound source virtual object may be clearly known on the interaction interface, thereby improving use experience of a user while improving the sound source determining accuracy.

In an optional implementation, before the displaying the position mark of the sound source virtual object according to the transparency, the method further includes at least one of the following:

S1. Forbid displaying the position mark of the sound source virtual object, in a case that the second position of the sound source virtual object is in a designated position of the virtual scene, the designated position including a birth place of the sound source virtual object in the virtual scene.

S2. Forbid displaying the position mark of the sound source virtual object, in a case that the sound source virtual object is in a designated posture, the designated posture including a creeping state.

S3. Forbid displaying the position mark of the sound source virtual object for the first virtual role, in a case that the sound source virtual object and the first virtual role have the same camp mark.

For example, a description is provided still with reference to the field of games. In a process of the game, when in the birth place or other special positions, even if a sound is detected, a position mark of the sound is not displayed. Alternatively, when a sound source virtual object that makes sounds is in a special state, such as going prone, creeping forward, or the like, even if the sound made by the sound source virtual object is detected, the position mark of the sound is not displayed; or when the sound source virtual object that makes the sounds and a role controlled by a user are in the same camp, even if the sound source virtual object makes the sound, the position mark of the sound is not displayed.

In this embodiment, by forbidding displaying the position mark in the foregoing situation, the sound source virtual object may be hidden under certain conditions, thereby increasing flexibility of displaying the position mark while improving the sound source determining accuracy.

To make the description simple, the foregoing method embodiments are stated as a series of action combinations. However, a person skilled in the art needs to know that this application is not limited to the described sequence of the actions because according to this application, some steps may use another sequence or may be simultaneously performed. In addition, a person skilled in the art shall also know that all the embodiments described in the specification are exemplary embodiments, and the related actions and modules are not necessarily mandatory to this application.

According to the foregoing descriptions of implementations, a person skilled in the art may clearly learn that the method according to the foregoing embodiments may be implemented using software and a necessary general hardware platform, or certainly may be implemented using hardware. However, in most cases, the former is a better implementation. Based on such an understanding, the technical solutions in this application essentially or the part contributing to the related art may be implemented in the form of a software product. The computer software product is stored in a storage medium (such as ROM/RAM, a magnetic disk, or an optical disc), and includes several instructions for instructing a terminal device (which may be a mobile phone, a computer, a server, a network device, or the like) to perform the method described in the embodiments of this application.

Figure 10:
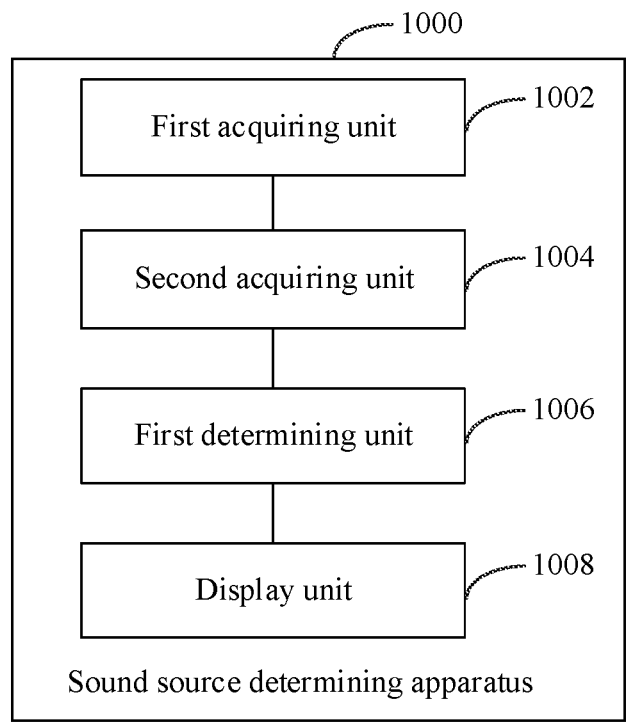
FIG. 10 is a schematic structural diagram of an optional sound source determining apparatus according to an embodiment of this application.

According to another aspect of the embodiments of this application, a sound source determining apparatus 1000 for implementing the foregoing sound source determining method is further provided. As shown in FIG. 10, the device includes:

(1) a first acquiring unit 1002, configured to acquire a first position of a first virtual role controlled by an application client in a virtual scene;

(2) a second acquiring unit 1004, configured to detect, in a sound source detection area associated with the first position, a second position of a sound source virtual object in the virtual scene;

(3) a first determining unit 1006, configured to determine transparency of a position mark that matches the sound source virtual object, according to a sound source distance between the first position and the second position, the position mark identifying the second position of the sound source virtual object; and (4) a display unit 1008, configured to display, on an interaction interface of the application client, the position mark of the sound source virtual object according to the transparency.

Optionally, the sound source determining apparatus may be applied, but not limited, to a field of games or a field of simulation training. In an optional implementation, the first determining unit 1006 includes:

a first acquiring module, configured to acquire a detection radius of a sound source detection area that matches the sound source virtual object; and a first determining module, configured to determine the transparency according to a ratio of the sound source distance to the detection radius, in a case that the ratio decreases, the transparency being decreased; and in a case that the ratio increases, the transparency being increased. In this embodiment, by determining the transparency according to the ratio of the sound source distance to the detection radius, the position mark of the sound source virtual object that is farther away from the first position may be made more apparent, thereby accurately determining the position of the sound source virtual object and improving the sound source determining accuracy.

In an optional implementation, the first acquiring module includes:

an acquiring submodule, configured to acquire a sound source type of a sound made by the sound source virtual object and an environment identifier of an environment in which the sound source virtual object is located; and a determining submodule, configured to determine the detection radius according to the sound source type and the environment identifier.

In this embodiment, the detection radius is determined according to the sound source type of the sound made by the sound source virtual object and the environment identifier of the environment in which the sound source virtual object is located, thereby increasing flexibility of displaying a position mark while improving accuracy of the sound source position determining.

In an optional implementation, the determining submodule is specifically configured to:

acquire an initial detection radius configured for the sound source type, a frequency of a sound indicated by the sound source type being inversely proportional to the initial detection radius;

acquire a sound triggering threshold that matches the environment identifier; and decrease the initial detection radius according to the sound triggering threshold, to obtain the detection radius.

In this embodiment, by acquiring the initial detection radius and decreasing the detection radius according to the sound triggering threshold matching the environment identifier, the initial detection radius may be adjusted according to different environments, thereby improving accuracy of the display position determining.

In an optional implementation the display unit 1008 includes:

a second acquiring module, configured to acquire a sound source type of the sound made by the sound source virtual object; and a first display module, configured to display the position mark of the sound source virtual object that matches the sound source type.

In this embodiment, by determining the position mark according to the sound source type of the sound made by the sound source virtual object, it is convenient for a user to accurately determine the sound source type according to the position mark, thereby improving the sound source determining accuracy.

In an optional implementation, the first display module includes at least one of the following:

a first display submodule, configured to display the position mark according to a color that matches the sound source type;

a second display submodule, configured to display the position mark according to a shape that matches the sound source type; and a third display submodule, configured to display the position mark according to an identifier that matches the sound source type.

In this embodiment, using different colors and shapes to adjust the position marks, the user knows the sound source type of the sound made by the sound source virtual object according to different display solutions, thereby increasing flexibility of displaying a position mark while improving the sound source determining accuracy.

In an optional implementation, the first display module includes at least one of the following:

a fourth display submodule, configured to display, at the second position in a map displayed on the interaction interface of the application client, the position mark of the sound source virtual object; and a fifth display submodule, configured to display, in a direction corresponding to the second position in a universal wheel displayed on the interaction interface of the application client, the position mark of the sound source virtual object.

In this embodiment, by displaying the position mark in the map of the interaction interface, or displaying the position mark in a universal wheel of the interaction interface, a main interface of the interaction interface may not be blocked, thereby improving use experience of the user while improving the sound source determining accuracy.

In an optional implementation, the first display module includes:

an adjustment submodule, configured to adjust a display range of the position mark, in a case that the sound source virtual object is equipped with a silencing apparatus, the display range of the position mark of the sound source virtual object equipped with the silencing apparatus being larger than a display range of the position mark of the sound source virtual object not equipped with the silencing apparatus.

In this embodiment, in a case of being equipped with the silencing apparatus, the display range of the position mark is adjusted, thereby increasing flexibility of displaying the position mark while improving the sound source determining accuracy.

In an optional implementation the display unit 1008 includes:

a second display module, configured to display, in a case that a plurality of sound source virtual objects are detected and the plurality of sound source virtual objects are located in different directions of the first virtual role, respective position marks of the plurality of sound source virtual objects according to transparency of the position marks that respectively match the plurality of sound source virtual objects.

In this embodiment, by displaying the position marks of the sound source virtual objects in different directions at the same time, the plurality of sound source virtual objects are displayed at the same time, thereby making the user know positions of the plurality of sound source virtual objects in a virtual environment at the same time, while improving the sound source determining accuracy.

In an optional implementation the display unit 1008 includes:

a third acquiring module, configured to acquire a sound triggering start moment of each sound source virtual object in a plurality of sound source virtual objects, in a case that the plurality of sound source virtual objects are detected and the plurality of sound source virtual objects are located in the same direction of the first virtual role;

a fourth acquiring module, configured to acquire, in sequence, a triggering time interval of the sound triggering start moments of the two adjacent sound source virtual objects;

a third determining module, configured to determine, in sequence, the transparency of the position mark that matches each sound source virtual object in the two adjacent sound source virtual objects, in a case that the triggering time interval is greater than a first threshold; and display, in sequence, the position marks of the two adjacent sound source virtual objects according to the determined transparency; and a fourth determining module, configured to determine, in a case that the triggering time interval is less than the first threshold, transparency of a position mark that matches a target sound source virtual object whose sound triggering start moment is later of the two adjacent sound source virtual objects; and display the position mark of the target sound source virtual object according to the determined transparency.

In this embodiment, by the foregoing solution of displaying the position marks of the sound source virtual objects in the same direction, a situation of mutual blocking caused by displaying the plurality of position marks in the same direction at the same time may be avoided, thereby increasing efficiency of displaying the position mark while improving the sound source determining accuracy.

In an optional implementation, the apparatus further includes:

a detection unit, configured to acquire, after the acquiring a first position of a first virtual role controlled by an application client in a virtual scene, a sound triggering start moment of each virtual object of a plurality of virtual objects, in a case that the plurality of virtual objects that make sounds are detected and the plurality of virtual objects are associated with the same virtual role in the sound source detection area associated with the first position; and a second determining unit, configured to determine a target virtual object as the sound source virtual object among the plurality of virtual objects according to the sound triggering start moment.

In this embodiment, by determining the sound source virtual object according to the sound triggering start moment, a mutual blocking problem, caused by displaying the plurality of virtual objects in the same position at the same time, may be avoided, thereby increasing efficiency of displaying the position mark while improving the sound source determining accuracy.

In an optional implementation the display unit 1008 includes:

a fifth acquiring module, configured to acquire a direction mark included in the position mark of the sound source virtual object, the direction mark indicating a moving direction of the sound source virtual object relative to the first virtual role at the sound triggering start moment; and a third display module, configured to display the direction mark in a display cycle of displaying the position mark of the sound source virtual object.

In this embodiment, by displaying the moving direction of the sound source virtual object, the moving direction of the sound source virtual object may be clearly known on the interaction interface, thereby improving use experience of a user while improving the sound source determining accuracy.

In an optional implementation, the apparatus further includes at least one of the following:

a first forbidding unit, configured to forbid, before the displaying the position mark of the sound source virtual object according to the transparency, displaying the position mark of the sound source virtual object, in a case that the second position of the sound source virtual object is in a designated position of the virtual scene, the designated position including a birth place of the sound source virtual object in the virtual scene;

a second forbidding unit, configured to forbid, before the displaying the position mark of the sound source virtual object according to the transparency, displaying the position mark of the sound source virtual object, in a case that the sound source virtual object is in a designated posture, the designated posture including a creeping state; and a third forbidding unit, configured to forbid, before the displaying the position mark of the sound source virtual object according to the transparency, displaying the position mark of the sound source virtual object for the first virtual role, in a case that the sound source virtual object and the first virtual role have the same camp mark.

In this embodiment, by forbidding displaying the position mark in the foregoing situation, the sound source virtual object may be hidden under certain conditions, thereby increasing flexibility of displaying the position mark while improving the sound source determining accuracy.

Figure 11:
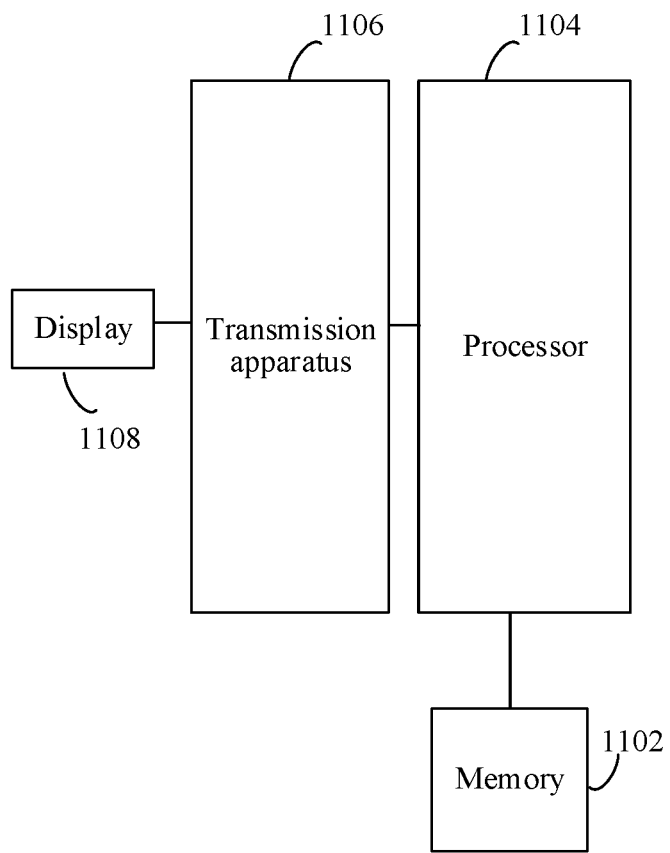
FIG. 11 is a schematic structural diagram of an optional electronic apparatus according to an embodiment of this application.

According to still another aspect of the embodiments of this application, an electronic apparatus for implementing the foregoing sound source determining method is further provided. As shown in FIG. 11, the electronic apparatus includes a memory and a processor, where a computer program is stored in the memory and the processor is configured to perform, through the computer program, the steps in any one of the foregoing method embodiments.

Optionally, in this embodiment, the electronic apparatus may be located in at least one network device in a plurality of network devices of a computer network.

Optionally, in this embodiment, the processor can be configured to perform, through the computer program, the following steps:

S1. Acquire a first position of a first virtual role controlled by an application client in a virtual scene.

S2. Detect, in a sound source detection area associated with the first position, a second position of the sound source virtual object in the virtual scene.

S3. Determine transparency of a position mark that matches the sound source virtual object, according to a sound source distance between the first position and the second position, the position mark identifying the second position of the sound source virtual object.

S4. Display, on an interaction interface of the application client, the position mark of the sound source virtual object according to the transparency.

Optionally, a person of ordinary skill in the art may understand that, the structure shown in FIG. 11 is only illustrative. The electronic apparatus may alternatively be a terminal device such as a smartphone (for example, an Android mobile phone or an iOS mobile phone), a tablet computer, a palmtop computer, a mobile Internet device (MID), or a portable Android device (PAD). FIG. 11 does not constitute a limitation on the structure of the foregoing electronic apparatus. For example, the electronic apparatus may alternatively include more or fewer components (such as a network interface, a display apparatus, or the like) than those shown in FIG. 11, or has a configuration different from that shown in FIG. 11.

The memory 1102 may be configured to store a software program and a module, for example, a program instruction/module corresponding to the sound source determining method and apparatus in the embodiments of this application, and the processor 1104 performs various functional applications and data processing by running a software program and a module stored in the memory 1102, that is, implementing the foregoing sound source determining method. The memory 1102 may include a high speed random access memory, and may further include a non-volatile memory, for example, one or more magnetic storage apparatuses, a flash memory, or another non-volatile solid-state memory. In some embodiments, the memory 1102 may further include memories remotely disposed relative to the processor 1104, and the remote memories may be connected to the terminal using a network. Examples of the network include but are not limited to, the Internet, an intranet, a local area network, a mobile communications network, and a combination thereof.

A transmission apparatus 1106 is configured to receive or send data through a network. Specific examples of the foregoing network may include a wired network and a wireless network. In an example, the transmission apparatus 1106 includes a network interface controller (NIC). The NIC may be connected to another network device and a router using a network cable, so as to communicate with the Internet or the local area network. In an example, the transmission apparatus 1106 is a radio frequency (RF) module, configured to communicate with the Internet in a wireless manner.

Specifically, the memory 1102 is configured to store the position mark of the sound source virtual object.

According to the embodiments of this application, a storage medium is further provided. The storage medium stores a computer program, the computer program being configured to perform steps in any one of the foregoing method embodiments when being run.

Optionally, in this embodiment, the storage medium may be configured to store a computer program used for performing the following steps:

S1. Acquire a first position of a first virtual role controlled by an application client in a virtual scene.

S2. Detect, in a sound source detection area associated with the first position, a second position of the sound source virtual object in the virtual scene.

S3. Determine transparency of a position mark that matches the sound source virtual object, according to a sound source distance between the first position and the second position, the position mark identifying the second position of the sound source virtual object.

S4. Display, on an interaction interface of the application client, the position mark of the sound source virtual object according to the transparency.

Optionally, in this embodiment, the storage medium may be configured to store a computer program used for performing the following steps:

S1. Acquire a detection radius of the sound source detection area that matches the sound source virtual object.

S2. Determine the transparency according to a ratio of the sound source distance to the detection radius, in a case that the ratio decreases, a transparency degree indicated by the transparency being decreased; and in a case that the ratio increases, the transparency degree indicated by the transparency being increased.

Optionally, in this embodiment, the storage medium may be configured to store a computer program used for performing the following steps:

S1. Acquire a sound source type of a sound made by the sound source virtual object and an environment identifier of an environment in which the sound source virtual object is located.

S2. Determine the detection radius according to the sound source type and the environment identifier.

Optionally, in this embodiment, the storage medium may be configured to store a computer program used for performing the following steps:

S1. Acquire an initial detection radius corresponding to the sound source type, a frequency of a sound indicated by the sound source type being inversely proportional to the initial detection radius.

S2. Acquire a sound triggering threshold that matches the environment identifier.

S3. Decrease the initial detection radius according to the sound triggering threshold, to obtain the detection radius.

Optionally, in this embodiment, the storage medium may be configured to store a computer program used for performing the following steps:

S1. Acquire a sound source type of a sound made by the sound source virtual object.

S2. Display a position mark of the sound source virtual object that matches the sound source type.

Optionally, in this embodiment, the storage medium may be configured to store a computer program used for performing the following steps:

S1. Display the position mark according to a color that matches the sound source type.

S2. Display the position mark according to a shape that matches the sound source type.

S3. Display the position mark according to an identifier that matches the sound source type.

Optionally, in this embodiment, the storage medium may be configured to store a computer program used for performing the following steps:

S1. Display, at the second position in a map displayed on the interaction interface of the application client, the position mark of the sound source virtual object.

S2. Display, in a direction corresponding to the second position in a universal wheel displayed on the interaction interface of the application client, the position mark of the sound source virtual object.

Optionally, in this embodiment, the storage medium may be configured to store a computer program used for performing the following step:

S1. Adjust a display range of the position mark, in a case that the sound source virtual object is equipped with a silencing apparatus, the display range of the position mark of the sound source virtual object equipped with the silencing apparatus being larger than a display range of the position mark of the sound source virtual object not equipped with the silencing apparatus.

Optionally, in this embodiment, the storage medium may be configured to store a computer program used for performing the following step:

S1. Display, in a case that a plurality of sound source virtual objects are detected and the plurality of sound source virtual objects are located in different directions of the first virtual role, respective position marks of the plurality of sound source virtual objects according to transparency of the position marks that respectively match the plurality of sound source virtual objects.

Optionally, in this embodiment, the storage medium may be configured to store a computer program used for performing the following steps:

S1. Acquire a sound triggering start moment of each sound source virtual object in a plurality of sound source virtual objects, in a case that the plurality of sound source virtual objects are detected and the plurality of sound source virtual objects are located in the same direction of the first virtual role.

S2. Acquire, in sequence, a triggering time interval of the sound triggering start moments of the two adjacent sound source virtual objects.

S3. Determine, in sequence, the transparency of the position mark that matches each sound source virtual object in the two adjacent sound source virtual objects, in a case that the triggering time interval is greater than a first threshold; and display, in sequence, the position marks of the two adjacent sound source virtual objects according to the determined transparency.

S4. Determine, in a case that the triggering time interval is less than the first threshold, transparency of a position mark that matches a target sound source virtual object whose sound triggering start moment is later of the two adjacent sound source virtual objects; and display the position mark of the target sound source virtual object according to the determined transparency.

Optionally, in this embodiment, the storage medium may be configured to store a computer program used for performing the following steps:

S1. Acquire a sound triggering start moment of each virtual object of a plurality of virtual objects, in a case that the plurality of virtual objects that make sounds are detected and the plurality of virtual objects are associated with the same virtual role in a sound source detection area associated with the first position.

S2. Determine a target virtual object as the sound source virtual object among the plurality of virtual objects according to the sound triggering start moment.

Optionally, in this embodiment, the storage medium may be configured to store a computer program used for performing the following steps:

S1. Acquire a direction mark included in the position mark of the sound source virtual object, the direction mark being used for indicating a moving direction of the sound source virtual object relative to the first virtual role at the sound triggering start moment.

S2. Display the direction mark in a display cycle that matches the sound source virtual object.

Optionally, in this embodiment, the storage medium may be configured to store a computer program used for performing the following steps:

S1. Forbid displaying the position mark of the sound source virtual object, in a case that the second position of the sound source virtual object is in a designated position of the virtual scene, the designated position including a birth place of the sound source virtual object in the virtual scene.

S2. Forbid displaying the position mark of the sound source virtual object, in a case that the sound source virtual object is in a designated posture, the designated posture including a creeping state.

S3. Forbid displaying the position mark of the sound source virtual object for the first virtual role, in a case that the sound source virtual object and the first virtual role have the same camp mark.

Optionally, in this embodiment, a person of ordinary skill in the art may understand that all or part of the steps of the methods in the embodiments may be implemented by a program by instructing hardware relevant to a terminal device. The program may be stored in a computer-readable storage medium, and the storage medium may include a flash drive, a Read-Only Memory (ROM), a Random Access Memory (RAM), a magnetic disk, an optical disc, or the like.

The sequence numbers of the foregoing embodiments of this application are merely for the convenience of description, and do not imply the preference among the embodiments.

In a case that the integrated unit in the foregoing embodiments is implemented in the form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods in the embodiments of this application.

In the foregoing embodiments of this application, the descriptions of the embodiments have their respective focuses. For a part that is not described in detail in an embodiment, reference may be made to the relevant descriptions of the other embodiments.

In the several embodiments provided in this application, it is to be understood that the disclosed client may be implemented in other manners. For example, the described device embodiment is merely for illustration purposes. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The foregoing descriptions are merely exemplary implementations of this application. A person of ordinary skill in the art may further make several improvements and refinements without departing from the principle of this application, and the improvements and refinements shall fall within the protection scope of this application.

What is claimed is:

1. A method for determining characteristics of a sound source comprising:
  acquiring a first position of a first virtual role controlled by an application client in a virtual scene;
  detecting, in a sound source detection area associated with the first position, a second position of a sound source virtual object in the virtual scene;
  determining transparency of a position mark that matches the sound source virtual object, according to a sound source distance between the first position and the second position, the position mark identifying the second position of the sound source virtual object;

in response to a plurality of sound source virtual objects being detected and located in different directions of the first virtual role, displaying, for each of the plurality of sound source virtual objects, a position mark of the each sound source virtual object according to transparency of the position mark of the each sound source virtual object on an interaction interface of the application client;

displaying a map on the interaction interface of the application client, the first position corresponding to a third position on the map; and displaying the position mark of the sound source virtual object at a fourth position on the map, wherein the fourth position relative to the third position reflecting a direction of the second position relative to the first position.

2. The method of claim 1, wherein determining the transparency of the position mark that matches the sound source virtual object comprises:

acquiring a detection radius of the sound source detection area that matches the sound source virtual object; and determining the transparency according to a ratio of the sound source distance to the detection radius, wherein the transparency is decreased in response to the ratio decreasing and the transparency is increased in response to the ratio increasing.

3. The method of claim 2, wherein acquiring the detection radius of the sound source detection area that matches the sound source virtual object comprises:

acquiring a sound source type of a sound made by the sound source virtual object and an environment identifier of an environment in which the sound source virtual object is located; and determining the detection radius according to the sound source type and the environment identifier.

4. The method of claim 3, wherein determining the detection radius according to the sound source type and the environment identifier comprises:

acquiring an initial detection radius corresponding to the sound source type, a frequency of a sound indicated by the sound source type being inversely proportional to the initial detection radius;

acquiring a sound triggering threshold associated with the environment identifier; and decreasing the initial detection radius according to the sound triggering threshold, to obtain the detection radius.

5. The method of claim 1, wherein displaying the position mark of the sound source virtual object according to the transparency comprises:

acquiring a sound source type of a sound made by the sound source virtual object; and displaying the position mark of the sound source virtual object that matches the sound source type.

6. The method of claim 5, wherein displaying the position mark of the sound source virtual object that matches the sound source type comprises:

displaying the position mark according to at least one of a color matching the sound source type, a shape matching the sound source type, or an identifier matching the sound source type.

7. The method of claim 5, wherein displaying the position mark of the sound source virtual object that matches the sound source type comprises:

displaying the position mark of the sound source virtual object at the second position in a map displayed on the interaction interface of the application client or in a direction corresponding to the second position in a universal wheel displayed on the interaction interface of the application client.

8. The method of claim 5, wherein displaying the position mark of the sound source virtual object that matches the sound source type comprises:

increasing a display range of the position mark in response to the sound source virtual object being equipped with a silencing apparatus.

9. The method of claim 1, wherein displaying the position mark of the sound source virtual object according to the transparency comprises:

in response to a plurality of sound source virtual objects are detected and located in a same direction of the first virtual role, acquiring respective sound triggering start moments of each of the plurality of sound source virtual objects;

acquiring a triggering time interval between sound triggering start moments of two adjacent sound source virtual objects in the plurality of sound source virtual objects;

in response to the triggering time interval being greater than a first threshold:
 determining transparencies of position marks that respectively matches each of the two adjacent sound source virtual objects, and
 displaying, in sequence, position marks of the two adjacent sound source virtual objects according to the determined transparencies; and in response to the triggering time interval being less than the first threshold:
 selecting one of the two adjacent sound source virtual objects whose sound triggering start moment is later as a target sound source virtual object,
 determining transparency of a position mark that matches the target sound source virtual object, and
 displaying the position mark of the target sound source virtual object according to the determined transparency.

10. The method of claim 1, wherein subsequent to acquiring the first position of the first virtual role, the method further comprises:

in response to a plurality of virtual objects that make sounds being detected and associated with a same virtual role in a sound source detection area associated with the first position, acquiring a sound triggering start moment of each of the plurality of virtual objects; and determining one of the plurality of virtual objects as the sound source virtual object according to the sound triggering start moment.

11. The method of claim 10, wherein the displaying the position mark of the sound source virtual object according to the transparency comprises:

acquiring a direction mark included in the position mark of the sound source virtual object, the direction mark indicating a moving direction of the sound source virtual object relative to the first virtual role at the sound triggering start moment; and displaying the direction mark in a display cycle that matches the sound source virtual object.

12. The method of claim 1, wherein prior to the displaying the position mark of the sound source virtual object according to the transparency, the method further comprises:

forbidding displaying the position mark of the sound source virtual object, in response to:
the second position of the sound source virtual object being in a designated position of the virtual scene, the designated position comprising a birth place of the sound source virtual object in the virtual scene,
the sound source virtual object being in a designated posture, the designated posture comprising a creeping state, or
the sound source virtual object and the first virtual role having the same camp mark.

13. The method of claim 1, wherein displaying the position mark of the sound source virtual object comprises:
displaying the position mark of the sound source virtual object and a moving direction of the sound source virtual object in a mini-map displayed on the interaction interface of the application client.

14. An apparatus for determining characteristics of a sound source, comprising:
a memory operable to store program code; and
a processor operable to read the program code and configured to:
acquire a first position of a first virtual role controlled by an application client in a virtual scene;
detect, in a sound source detection area associated with the first position, a second position of a sound source virtual object in the virtual scene;
determine transparency of a position mark that matches the sound source virtual object, according to a sound source distance between the first position and the second position, the position mark identifying the second position of the sound source virtual object;
in response to a plurality of sound source virtual objects being detected and located in different directions of the first virtual role, display, for each of the plurality of sound source virtual objects, a position mark of the each sound source virtual object according to transparency of the position mark of the each sound source virtual object on an interaction interface of the application client;
display a map on the interaction interface of the application client, the first position corresponding to a third position on the map; and
display the position mark of the sound source virtual object at a fourth position on the map, wherein the fourth position relative to the third position reflecting a direction of the second position relative to the first position.

15. The apparatus of claim 14, wherein the processor is configured to:
acquire a detection radius of the sound source detection area that matches the sound source virtual object; and
determine the transparency according to a ratio of the sound source distance to the detection radius, wherein the transparency is decreased in response to the ratio decreasing and the transparency is increased in response to the ratio increasing.

16. The apparatus of claim 15, wherein the processor is configured to:
acquire a sound source type of a sound made by the sound source virtual object and an environment identifier of an environment in which the sound source virtual object is located; and
determine the detection radius according to the sound source type and the environment identifier.

17. The apparatus of claim 16, wherein the processor is configured to:
acquire an initial detection radius corresponding to the sound source type, a frequency of a sound indicated by the sound source type being inversely proportional to the initial detection radius;
acquire a sound triggering threshold that matches the environment identifier; and
decrease the initial detection radius according to the sound triggering threshold, to obtain the detection radius.

18. The apparatus of claim 14, wherein the processor is configured to:
acquire a sound source type of a sound made by the sound source virtual object; and
display the position mark of the sound source virtual object that matches the sound source type.

19. The apparatus of claim 18, wherein the processor is configured to:
display the position mark according to at least one of a color matching the sound source type, a shape matching the sound source type, or an identifier matching the sound source type.

20. A non-transitory machine-readable media, having processor executable instructions stored thereon for causing a processor to:
acquire a first position of a first virtual role controlled by an application client in a virtual scene;
detect, in a sound source detection area associated with the first position, a second position of a sound source virtual object in the virtual scene;
determine transparency of a position mark that matches the sound source virtual object, according to a sound source distance between the first position and the second position, the position mark identifying the second position of the sound source virtual object;
in response to a plurality of sound source virtual objects being detected and located in different directions of the first virtual role, display, for each of the plurality of sound source virtual objects, a position mark of the each sound source virtual object according to transparency of the position mark of the each sound source virtual object on an interaction interface of the application client;
display a map on the interaction interface of the application client, the first position of the first virtual role corresponding to a third position on the map; and
display the position mark of the sound source virtual object at a fourth position on the map, wherein the fourth position relative to the third position reflecting a direction of the second position relative to the first position.

* * * * *